United States Patent
Loeken et al.

(10) Patent No.: US 11,913,818 B2
(45) Date of Patent: Feb. 27, 2024

(54) SENSOR DEVICE AND FLUID FLOW-RATE MEASURING ASSEMBLY HAVING A SENSOR DEVICE OF THIS TYPE

(71) Applicant: FRABA B.V., Sg Heerlen (NL)

(72) Inventors: Michael Loeken, Juelich (DE); Matthias Lansing, Aachen (DE); Florian Hallermann, Aachen (DE)

(73) Assignee: FRABA B.V., Sg Heerlen (NL)

( * ) Notice: Subject to any disclaimer, the term of this patent is extended or adjusted under 35 U.S.C. 154(b) by 77 days.

(21) Appl. No.: 17/619,259

(22) PCT Filed: Jun. 15, 2020

(86) PCT No.: PCT/EP2020/066513
§ 371 (c)(1),
(2) Date: Dec. 15, 2021

(87) PCT Pub. No.: WO2020/254258
PCT Pub. Date: Dec. 24, 2020

(65) Prior Publication Data
US 2022/0283009 A1    Sep. 8, 2022

(30) Foreign Application Priority Data
Jun. 19, 2019   (DE) .................. 10 2019 116 636.5

(51) Int. Cl.
*G01F 15/061*   (2022.01)
*G01F 1/075*    (2006.01)
(Continued)

(52) U.S. Cl.
CPC ............ *G01F 15/061* (2013.01); *G01F 1/075* (2013.01); *G01F 15/065* (2013.01); *G01P 3/4815* (2013.01)

(58) Field of Classification Search
CPC ...... G01F 15/061; G01F 1/075; G01F 15/065; G01F 1/08; G01F 15/024; G01F 15/066; G01P 3/4815; G01D 21/00
See application file for complete search history.

(56) References Cited

U.S. PATENT DOCUMENTS

2008/0216567 A1  9/2008  Breed
2009/0187356 A1  7/2009  Artiuch
(Continued)

FOREIGN PATENT DOCUMENTS

DE    10 2007 039 051 A1   2/2009
DE    10 2008 039 272 A1   2/2010
(Continued)

*Primary Examiner* — Peter J Macchiarolo
*Assistant Examiner* — John M Royston
(74) *Attorney, Agent, or Firm* — Norman B. Thot

(57) ABSTRACT

A sensor device includes an excitation magnet which generates an alternating excitation magnetic field, an energy generator having a pulse wire module in which electric energy pulses are generatable via the alternating excitation magnetic field, at least one sensor element which senses a physical variable and which provides a sensor signal, an evaluation unit which evaluates the sensor signal, and a wireless data interface which is connected to the evaluation unit via a data connection. The at least one sensor element and the evaluation unit are each electrically connected to the energy generator and are suppliable with an electric energy thereby.

9 Claims, 1 Drawing Sheet

(51) Int. Cl.
    *G01F 15/06*     (2022.01)
    *G01P 3/481*     (2006.01)

(56) References Cited

U.S. PATENT DOCUMENTS

| | | |
|---|---|---|
| 2011/0184691 A1 | 7/2011 | Mehnert et al. |
| 2011/0203364 A1 | 8/2011 | Staake et al. |
| 2012/0176609 A1 | 7/2012 | Seppä et al. |
| 2012/0268109 A1 | 10/2012 | Mehnert et al. |
| 2013/0317761 A1 | 11/2013 | Mehnert et al. |
| 2015/0135852 A1 | 5/2015 | Efimov et al. |
| 2016/0328637 A1* | 11/2016 | Viikari .................... H04Q 9/00 |
| 2020/0103264 A1* | 4/2020 | Holmstadt .......... G01L 19/0061 |

FOREIGN PATENT DOCUMENTS

| | | |
|---|---|---|
| DE | 10 2011 011871 A1 | 7/2012 |
| DE | 10 2012 009 962 A1 | 11/2013 |
| EP | 2 080 999 A1 | 7/2009 |
| EP | 2 479 542 A1 | 7/2012 |
| EP | 2 515 084 A1 | 10/2012 |
| JP | 2014-505246 A | 2/2014 |

\* cited by examiner

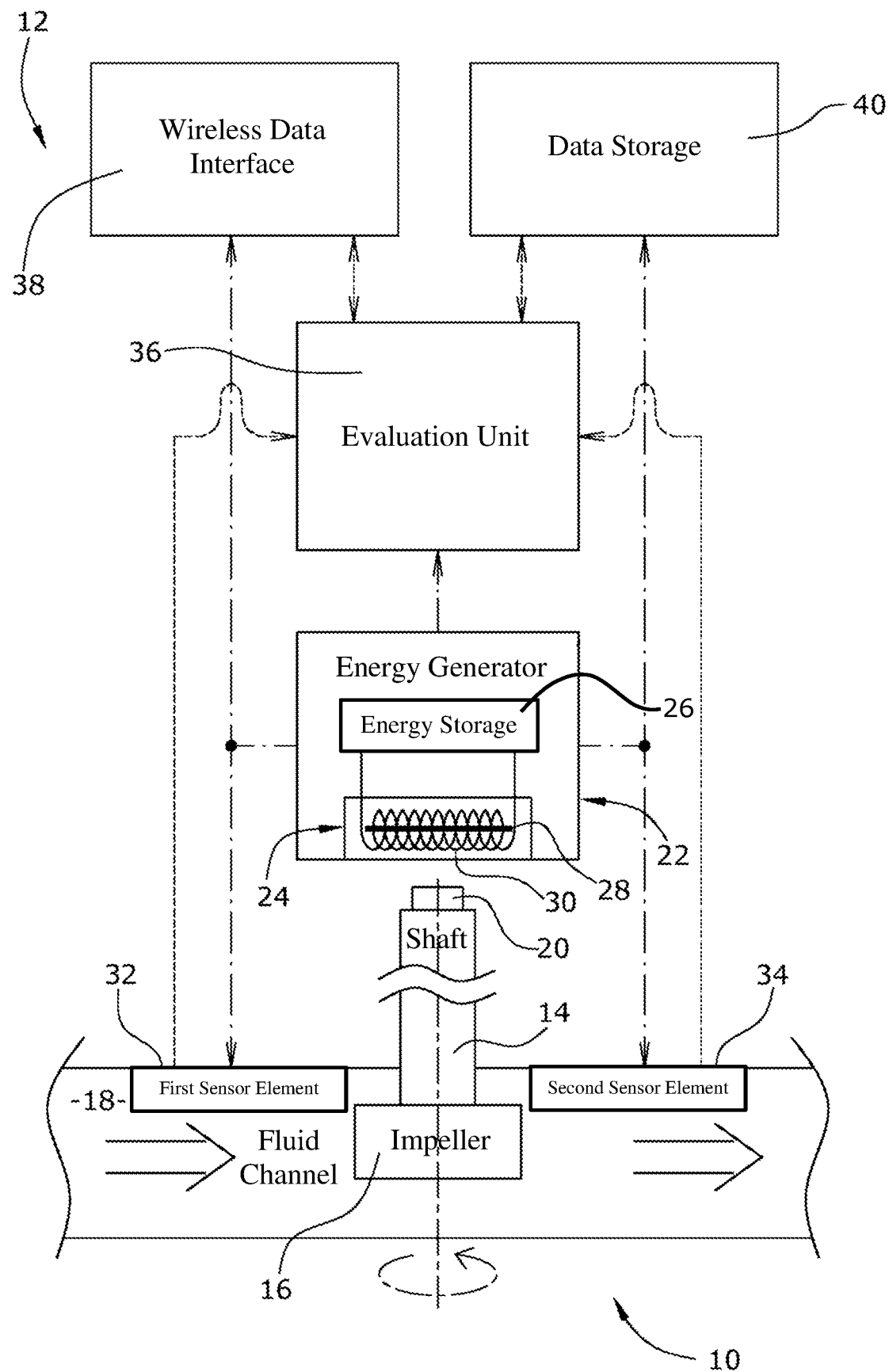

SENSOR DEVICE AND FLUID FLOW-RATE MEASURING ASSEMBLY HAVING A SENSOR DEVICE OF THIS TYPE

CROSS REFERENCE TO PRIOR APPLICATIONS

This application is a U.S. National Phase application under 35 U.S.C. § 371 of International Application No. PCT/EP2020/066513, filed on Jun. 15, 2020 and which claims benefit to German Patent Application No. 10 2019 116 636.5, filed on Jun. 19, 2019. The International Application was published in German on Dec. 24, 2020 as WO 2020/254258 A1 under PCT Article 21(2).

FIELD

The present invention relates to a sensor device having an excitation magnet for generating an alternating excitation magnetic field, an energy generator having a pulse wire element in which energy pulses can be generated by the alternating excitation magnetic field, at least one sensor element for sensing a physical variable and for providing a sensor signal, and an evaluation unit for evaluating the sensor signal. The present invention further relates to a fluid flow rate measuring assembly having such a sensor device.

BACKGROUND

Such sensor devices and/or fluid flow rate measuring assemblies can be used, for example, in complex industrial plants. Such sensor devices can thereby be used, for example, for sensing the rotational movement of a machine shaft, and such fluid flow rate measuring assemblies can thereby be used, for example, for sensing the flow rate of a gas or liquid line.

EP 2 479 542 B2 describes a fluid flow rate measuring assembly having such a sensor device, wherein the excitation magnet of the sensor device is arranged at a shaft driven by a gas flow. The described sensor device comprises a position sensor for sensing a current rotation angle of the shaft as well as a temperature sensor and a pressure sensor for sensing the current temperature and the current pressure of the gas flowing through the fluid flow rate measuring assembly. In the described sensor device, the alternating excitation magnetic field generated by the excitation magnet generates electric energy pulses in the pulse wire element of the energy generator during operation. The thus generated electric energy is here sufficient for supplying both the plurality of sensor elements and the evaluation unit with the respective electric energy required for operation. The sensor device of the described fluid flow rate measuring assembly consequently operates in an energy self-sufficient manner so that no external energy supply is required for operating the fluid flow rate measuring assembly.

For reading out the sensed and/or detected output parameters, the described sensor device and/or the fluid flow rate measuring assembly require, however, a wired data connection. Either a permanent cable connection installed in a complex manner and leading to the sensor device and/or the fluid flow rate measuring assembly must therefore be provided or the sensor device and/or the fluid flow rate measuring assembly must be installed at a relatively easy to access location so that, for a reading operation, a cable can be connected to the sensor device and/or the fluid flow rate measuring assembly if required.

SUMMARY

An aspect of the present invention is to provide a sensor device and/or a fluid flow rate measuring assembly which can be installed in an inexpensive manner even at difficult-to-access measuring locations.

In an embodiment, the present invention provides a sensor device which includes an excitation magnet which is configured to generate an alternating excitation magnetic field, an energy generator comprising a pulse wire module in which electric energy pulses are generatable via the alternating excitation magnetic field, at least one sensor element which is configured to sense a physical variable and to provide a sensor signal, an evaluation unit which is configured to evaluate the sensor signal, and a wireless data interface which is connected to the evaluation unit via a data connection. The at least one sensor element and the evaluation unit are each electrically connected to the energy generator and are suppliable with an electric energy thereby.

BRIEF DESCRIPTION OF THE DRAWING

The present invention is described in greater detail below on the basis of embodiments and of the drawing in which:

The FIGURE shows a schematic diagram of the fluid flow rate measuring assembly according to the present invention having the sensor device according to the present invention.

DETAILED DESCRIPTION

The sensor device according to the present invention comprises an excitation magnet for generating an alternating excitation magnetic field. The permanent-magnetic excitation magnet is typically attached to a rotatable shaft so that the rotational movement of the shaft generates the alternating excitation magnetic field. The excitation magnet can alternatively also be attached to a device which linearly moves forward and backward or on any closed curved track. The movement of the permanent-magnetic excitation magnet in any case generates an alternating excitation magnetic field, i.e., an excitation magnetic field where the polarity is continuously reversed, i.e., the (effective) direction of the field lines continuously changes over time.

The sensor device according to the present invention comprises an energy generator having a pulse wire module in which electric energy pulses can be generated by the alternating excitation magnetic field. The pulse wire module generally comprises a pulse wire (which is also referred to as a Wiegand wire) and a coil assembly radially enclosing the pulse wire. The magnetization direction of the pulse wire abruptly changes when an external magnetic field acts upon the pulse wire once a specific triggering field strength is exceeded. A short voltage pulse with a defined electric energy is thereby generated in the coil assembly. The change of the magnetization direction of the pulse wire is hereinafter also referred to as a "triggering" of the pulse wire module. The pulse wire module typically comprises a single pulse wire, but it can also comprise a plurality of pulse wires.

The sensor device according to the present invention comprises at least one sensor element for sensing a physical variable and for providing a sensor signal. The sensor element can be a temperature sensor for sensing a device temperature and/or a fluid temperature or a pressure sensor for sensing, for example, a fluid pressure. The sensor element can further be a movement and/or acceleration sensor for sensing the movement (also vibrations or temporary shocks) and/or the spatial orientation of a device. A force sensor, a magnetic field sensor, a humidity sensor, a sound pressure sensor and/or a brightness sensor are, for example, also conceivable. The sensor element can generally be any type of sensor which is configured for sensing a physical variable and for providing a sensor signal depending on the sensed variable. The sensor device according to the present invention can comprise a single sensor element or can comprise a plurality of different or similar sensor elements.

The sensor device according to the present invention comprises an evaluation unit for evaluating the at least one sensor signal. For transferring the sensor signal, the evaluation unit can, for example, be electrically connected to the at least one sensor element. The evaluation unit can however generally be connected to the at least one sensor element via any type of data connection. The evaluation unit evaluates the received sensor signal in a predefined manner for determining at least one output parameter. The evaluation unit can comprise a microcontroller or be entirely constituted by a microcontroller. The evaluation unit can, however, generally be constituted by any electric circuit which is suitable for evaluating the at least one sensor signal and determining an output parameter.

The sensor device according to the present invention comprises a wireless data interface which is connected to the evaluation unit via a data connection. The wireless data interface enables a wireless communication with an external EDP system having a suitable receiving interface and in particular enables a wireless reading and/or transmitting of the output parameter detected by the evaluation unit. The sensor device according to the present invention is thus generally suitable for being linked to the so-called "internet of things" (IoT). The wireless data interface can be based on the conventional interface standards/specifications "(passive) Wi-Fi, "LoRa (backscatter)", "Bluetooth", "SigFox", "Zigbee" or "RFDI", for example. The wireless data interface can, however, generally be constituted by any type of electric circuit which enables a wireless data transfer. The wireless data interface can, for example, be configured so that the electric energy required for operation of the wireless data interface can be generated by the wireless data interface itself, for example, from incident electromagnetic radiation. The wireless data interface can alternatively, however, also be configured so that it can be supplied with the required electric energy by the energy generator.

According to the present invention, the at least one sensor element and the evaluation unit are each electrically connected to the energy generator and can be supplied with the required electric energy thereby. The individual components can be directly electrically connected to the energy generator, or they can be indirectly connected (for example, via a voltage transformer or another sensor device component) to the energy generator. The electric energy required for a proper operation of the sensor device is in any case entirely generated and provided by the energy generator. The sensor device according to the present invention operates in an entirely energy self-sufficient manner and does thus not require any external energy supply, i.e., neither via a cable nor via a battery.

In the sensor device according to the present invention, a cable connection need not be provided for the energy supply or for the transfer of the output parameters. The sensor device according to the present invention also need not be relatively easily accessible for energy supply purposes (battery change) or reading-out of the output parameters. The sensor device according to the present invention can therefore be installed in an inexpensive manner even at difficult-to-access measuring locations.

The fluid flow rate measuring assembly according to the present invention comprises a shaft whose current rotational speed is proportional to the current fluid flow rate. The fluid flow rate measuring assembly typically comprises an impeller connected to the shaft for rotation therewith which is approached by the fluid flowing through the fluid flow rate measurement assembly so that the impeller, and hence the shaft, are rotationally driven by the fluid.

The fluid flow rate measuring assembly according to the present invention comprises a sensor device according to the present invention as described above, wherein the excitation magnet is fastened to the shaft and is thus driven by the fluid flow. The alternating frequency of the excitation magnetic field generated by the excitation magnet is here directly proportional to the rotational speed of the shaft and thus to the current fluid flow rate.

The evaluation unit of the sensor device of the fluid flow rate measuring assembly according to the present invention is configured for sensing a rotational movement of the shaft by evaluating the energy pulses of the pulse wire element. Evaluation of the energy pulses is here generally to be understood as any type of processing of an energy pulse information, in particular a simple counting of the generated energy pulses. The evaluation unit typically evaluates the time course of the energy pulses of the pulse wire element for determining the alternating frequency of the excitation magnetic field, wherein, in turn, the current shaft rotational speed and thus the current fluid flow rate can be determined via the current alternating frequency. The evaluation of the energy pulses can here either be performed continuously or can be performed retroactively on the basis of a stored energy pulse pattern.

At least one sensor element of the sensor device of the fluid flow rate measuring assembly is arranged and configured so that a physical property of the fluid flowing through the fluid flow rate measuring assembly can be sensed by the at least one sensor element. Besides the current fluid flow rate, the fluid flow rate measuring assembly according to the present invention can thus also sense at least one physical property of the fluid. The sensor device of the fluid flow rate measuring assembly according to the present invention can, for example, comprise a temperature sensor and/or a pressure sensor for sensing the current fluid temperature and/or the current fluid pressure. A versatile fluid flow rate measuring assembly is thus created. A correlation with the sensed physical fluid properties further enables a particularly exact sensing of the fluid flow rate.

Since a cable connection need not be provided for either the energy supply or for reading out or transferring the output parameters in the sensor device according to the present invention, the fluid flow rate measuring assembly according to the present invention is inexpensive to install even at difficult-to-access measuring locations, for example, in a complex industrial plant.

Since merely relatively short energy pulses are generated when the pulse wire module is triggered, according to an embodiment of the present invention, the energy generator can, for example, comprise an energy storage which is electrically connected to the pulse wire module and in which the electric energy of the energy pulses can be temporarily stored. Starting from a specific alternating frequency of the excitation magnetic field, this enables an essentially continuous energy supply of the sensor device components. The energy storage also enables a short-time operation of the sensor device, for example, for reading out the sensor device via the wireless data interface, even when no excitation magnetic field exists and thus no energy is generated. The energy storage is typically configured so that its storage capacity is larger than the electric energy of a single energy pulse. Unless the entire electric energy of the generated energy pulses is required for operating the sensor device, the energy storage consequently allows for temporarily providing an electric energy which is larger than the electric energy of a single energy pulse. The energy storage can, for example, be configured as an inexpensive ceramic capacitor.

At least one resistive sensor element is advantageously provided whose electric resistance changes depending on the physical variable to be sensed. The resistive sensor element is easy and inexpensive to realize and only requires a relatively small amount of electric energy for reliably functioning. The resistive sensor element can, for example, be a resistive temperature sensor, a resistive pressure sensor, or a resistive force sensor.

According to an advantageous embodiment of the present invention, a plurality of sensor elements are provided, wherein each sensor element is configured for sensing a different physical variable and wherein each sensor element can be supplied with electric energy by the energy generator. The sensor device is thus suitable for sensing different physical variables and in particular correlating them during the evaluation. This enables a particularly exact evaluation, and thus a reliable and versatile sensor device is created which operates in an energy self-sufficient manner.

According to an embodiment of the present invention, the wireless data interface can, for example, operate according to the principle of modulated backscattering. This means that the wireless data interface does not generate its own radio signals, but reflects incoming radio signals and in doing so modulates them, normally via an inversely phased field weakening. Substantially less electric energy is required therefor compared to an active generation of radio signals. The wireless data interface can, for example, be configured so that the electric energy required for modulation purposes is generated from an incident electromagnetic radiation so that no external energy supply for the operation of the wireless data interface is required. A particularly energy-efficient wireless data interface is thereby created which enables a reliable data transfer without an external energy supply or with only a relatively small external energy supply.

The wireless data interface can, for example, be electrically connected to the energy generator. The wireless data interface can be directly electrically connected to the energy generator or can be indirectly connected to the energy generator, for example, via a voltage transformer or another sensor device component. An energy transfer, i.e., a transfer of electric energy, between the wireless data interface and the energy generator is in any case possible. The electric connection is here configured so that a bidirectional energy transfer is, for example, possible, i.e., both a transfer of electric energy from the energy generator to the wireless data interface and a transfer of electric energy from the wireless data interface to the energy generator. If the wireless data interface is configured so that more energy is generated in the wireless data interface than is required for the operation of the wireless data interface, this energy can be provided to the energy generator and thus be used for the energy supply of the sensor device. If the wireless data interface does not generate any electric energy or the electric energy generated in the wireless data interface is not sufficient for the operation thereof, the required electric energy can be provided from the energy generator to the wireless data interface via the electric connection. A reliable functioning of the wireless data interface is thereby provided. The electric connection between the energy generator and the wireless data interface thus creates a particularly reliable and energy-efficient sensor device.

A data storage is advantageously provided which is connected to the evaluation unit via a data connection. The data storage enables the storing of output parameters detected by the evaluation unit so that they need not be continuously transferred, but can be collectively read out and/or transferred when required. The data storage is here, for example, configured as a nonvolatile data storage (for example, as a ferroelectric storage) so that the data can be read out even after an interruption of the energy supply. An energy-efficient and reliable sensor device is thereby provided.

The excitation magnet of the sensor device is typically arranged at a rotatable shaft. According to an advantageous embodiment of the present invention, the evaluation unit can, for example, here be configured for sensing a rotational movement of the shaft by evaluating the energy pulses of the pulse wire element. Evaluation of the energy pulses is here generally to be understood as any kind of processing of an energy pulse information, in particular a simple counting of the generated energy pulses. The evaluation of the energy pulses can here either be performed continuously or can be performed retroactively on the basis of a stored energy pulse pattern. The evaluation unit typically evaluates the time course of the energy pulses of the pulse wire element for determining the alternating frequency of the excitation magnetic field. The excitation magnet is here arranged at the shaft so that the current alternating frequency of the excitation magnetic field is directly proportional to a current shaft rotational speed. No additional sensor element is thus required for sensing the shaft rotational movement. An inexpensive and energy-efficient sensor device is hence created which can be used in a versatile manner.

An exemplary embodiment of the fluid flow rate measuring assembly according to the present invention having a sensor device according to the present invention is hereunder described on the basis of the attached drawing which shows a schematic diagram of the fluid flow rate measuring assembly according to the present invention having the sensor device according to the present invention.

The FIGURE shows a fluid flow rate measuring assembly 10 having a sensor device 12 and a shaft 14. The shaft 14 is connected to an impeller 16 for rotation therewith, which impeller 16 is arranged in a fluid channel 18 through which a fluid flows. The impeller 16 is configured so that the impeller 16, and thus the shaft 14, are rotationally driven by the fluid flowing through the fluid channel 18.

The sensor device 12 comprises a permanent-magnetic excitation magnet 20 which is fastened to an end of the shaft 14 facing away from the impeller 16. The excitation magnet 20 is connected the shaft 14 for rotation therewith and is configured and arranged so that the excitation magnet 20 generates an alternating excitation magnetic field when the shaft 14 rotates.

The sensor device 12 further comprises an energy generator 22 having a pulse wire module 24 and an energy storage 26. The energy storage 26 is electrically connected to the pulse wire module 24 and can be constituted, for example, by a simple capacitor. Due to the alternating excitation magnetic field, the magnetization direction of a pulse wire 28 (Wiegand wire) of the pulse wire module 24 changes continuously, wherein with each change of the magnetization direction an electric energy pulse is generated in a coil assembly 30 radially enclosing the pulse wire 28.

In the present exemplary embodiment, the energy storage 26 is charged with the electric energy of the generated energy pulses. The generated electric energy is thus temporarily stored in the energy storage 26. The energy storage 26 is here configured so that its storage capacity is larger than the electric energy of a single energy pulse.

In the present exemplary embodiment, the sensor device 12 comprises two sensor elements 32, 34 arranged in the fluid channel 18 for sensing a physical property of the fluid flowing through the fluid channel 18. The two sensor elements 32, 34 are each electrically connected to the energy storage 26 for energy supply purposes, wherein the energy generator 22 respectively provides the entire electric energy required for operation purposes to the two sensor elements 32, 34.

In the present exemplary embodiment, the first sensor element 32 is a resistive temperature sensor whose electric resistance changes depending on the temperature. In the present exemplary embodiment, when a constant electric voltage is applied, the first sensor element 32 therefore provides a temperature sensor signal whose electric-current strength is proportional to the sensed temperature. A constant electric current can alternatively be supplied to the first sensor element 32, wherein, in this case, an electric voltage of the temperature sensor signal is proportional to the sensed temperature.

In the present exemplary embodiment, the second sensor element 34 is a resistive pressure sensor whose electric resistance changes depending on the ambient pressure. In the present exemplary embodiment, when a constant electric voltage is applied, the second sensor element 34 thus provides a pressure sensor signal whose electric-current strength is proportional to the sensed ambient pressure, or, when a constant electric current is supplied, provides a pressure sensor signal whose electric voltage is proportional to the sensed ambient pressure.

The sensor device 12 further comprise an evaluation unit 36 which is electrically connected to the energy generator 22 for energy supply purposes, wherein the energy generator 22 of the evaluation unit 36 provides the entire energy required for operation purposes. The evaluation unit 36 is respectively electrically connected to the two sensor elements 32, 34 for sensor signal transfer purposes. The evaluation unit 36 can alternatively be connected to the sensor elements 32, 34 via any type of data interface for sensor signal transfer purposes. The evaluation unit 36 is configured for evaluating the sensor signals received by the two sensor elements 32, 34 and determining and providing corresponding output parameters. In the present exemplary embodiment, the evaluation unit 36 is further configured for evaluating the time course of energy pulses generated in the pulse wire element 24 of the energy generator 22 and thereby determining and providing a current rotational speed and/or a current rotational angle of the shaft 14.

The sensor device 12 further comprises a wireless data interface 38 which is electrically connected to the energy generator 22. The wireless data interface 38 is connected to the evaluation unit 36 via a data connection, wherein the data connection can, for example, be configured as a simple electric connection. The wireless data interface enables a wireless transfer of the output parameters determined by the evaluation unit 36 to an external EPD system (which is not shown in the FIGURE) having a corresponding receiving interface, for example. In the present exemplary embodiment, the wireless data interface 38 operates according to the principle of modulated backscattering, for example, according to the known "LoRa backscatter" specification. The electric energy required for operating the wireless data interface 38 is here (ideally entirely) generated from a received electromagnetic radiation. In the ideal case, for operating the wireless data interface 38, no electric energy need therefore be provided from the energy generator 22 to the wireless data interface 38, the wireless data interface 38 can rather provide electric energy to the energy generator 22 if the wireless data interface 38 generates more electric energy than required for the operation thereof. If the electric energy generated in the wireless data interface 38 is at times not sufficient for operating the wireless data interface 38, the thus unavailable electric energy can, however, then be provided from energy generator 22 to the wireless data interface 38.

In the present exemplary embodiment, the sensor device 12 further comprises a data storage 40 which is electrically connected to the energy generator 22 for energy supply purposes, wherein the energy generator 22 provides the entire electric energy required for operation purposes to the data storage 40. The data storage 40 can, for example, be configured as a nonvolatile ferroelectric data storage. The data storage 40 is connected to the evaluation unit 36 via a data connection (for example, via a simple electric connection) and, for example, enables storage of the output parameters determined by the evaluation unit 36.

The present invention is not limited to embodiments described herein; reference should be had to the appended claims.

LIST OF REFERENCE NUMERALS

10 Fluid flow rate measuring assembly
12 Sensor device
14 Shaft
16 Impeller
18 Fluid channel
20 Excitation magnet
22 Energy generator
24 Pulse wire module
26 Energy storage
28 Pulse wire
30 Coil assembly
32 First sensor element
34 Second sensor element
36 Evaluation unit
38 Wireless data interface
40 Data storage

What is claimed is:

1. A sensor device comprising:
an excitation magnet which is configured to generate an alternating excitation magnetic field;
an energy generator comprising a pulse wire module in which electric energy pulses are generatable via the alternating excitation magnetic field;
at least one sensor element which is configured to sense a physical variable and to provide a sensor signal;
an evaluation unit which is configured to evaluate the sensor signal; and
a wireless data interface which is connected to the evaluation unit via a data connection,
wherein,
the at least one sensor element and the evaluation unit are each electrically connected to the energy generator and are suppliable with an electric energy thereby, and
the wireless data interface is configured to generate an energy in excess of that which is required for an operation of the wireless data interface so that the excess energy generated by the wireless data interface can be used for an energy supply of the sensor device.

2. The sensor device as recited in claim 1, wherein the energy generator further comprises an energy storage which is electrically connected to the pulse wire module.

3. The sensor device as recited in claim 1, wherein the at least one sensor element comprises at least one resistive sensor element which is configured to have its electric resistance change depending on the physical variable to be sensed.

4. The sensor device as recited in claim 1, wherein the at least one sensor element comprises a plurality of sensor elements,
   wherein,
   each of the plurality of sensor elements is configured to sense a different physical variable, and
   each of the plurality of sensor elements is suppliable with the electric energy by the energy generator.

5. The sensor device as recited in claim 1, wherein the wireless data interface is configured to operate according to a modulated backscattering principle.

6. The sensor device as recited in claim 1, further comprising:
   a data storage which is connected to the evaluating unit via a data connection.

7. The sensor device as recited in claim 1, wherein the wireless data interface is electrically connected to the energy generator so that the electric energy is transferable between the wireless data interface and the energy generator.

8. The sensor device as recited in claim 1, wherein,
   the excitation magnet is arranged on a rotatable shaft, and
   the evaluation unit is further configured to sense a rotational movement of the rotatable shaft by evaluating a time course of the electric energy pulses of the pulse wire module.

9. A fluid flow rate measuring assembly comprising:
   a shaft whose current rotational speed is proportional to a current fluid flow rate; and
   a sensor device comprising,
      an excitation magnet which is fastened to the shaft and which is configured to generate an alternating excitation magnetic field,
      an energy generator comprising a pulse wire module in which electric energy pulses are generatable via the alternating excitation magnetic field,
      at least one sensor element which is configured to sense a physical property of a fluid flowing through the fluid flow rate measuring assembly and to provide a sensor signal,
      an evaluation unit which is configured to evaluate the sensor signal and to sense a rotational movement of the shaft by evaluating a time course of the electric energy pulses of the pulse wire element, and
      a wireless data interface which is connected to the evaluation unit via a data connection,
   wherein,
      the at least one sensor element, the evaluation unit, and the wireless data interface are each electrically connected to the energy generator and can be supplied with an electric energy thereby, and
      the wireless data interface is configured to generate an energy in excess of that which is required for an operation of the wireless data interface so that the excess energy generated by the wireless data interface can be used for an energy supply of the sensor device.

\* \* \* \* \*